BOLSTER HOIST

Original Filed Oct. 23, 1963 3 Sheets-Sheet 1

INVENTOR.
ELDON D. JONES
BY Rudolph L. Lowell
ATTORNEY.

BOLSTER HOIST

Original Filed Oct. 23, 1963 3 Sheets-Sheet 2

INVENTOR.
ELDON D. JONES
BY Rudolph R. Lowell
ATTORNEY.

BOLSTER HOIST

Original Filed Oct. 23, 1963 3 Sheets-Sheet 3

INVENTOR.
ELDON D. JONES
BY Rudolph R. Rowell
ATTORNEY.

United States Patent Office

Re. 26,455
Reissued Sept. 10, 1968

26,455
BOLSTER HOIST

Eldon D. Jones, Lake Crystal, Minn. 56055

Original No. 3,179,470, dated Apr. 20, 1965, Ser. No. 318,234, Oct. 23, 1963. Application for reissue Mar. 10, 1967, Ser. No. 626,354
5 Claims. (Cl. 298—22)

Matter enclosed in heavy brackets [ ] appears in the original patent but forms no part of this reissue specification; matter printed in italics indicates the additions made by reissue.

*ABSTRACT OF THE DISCLOSURE*

*A bolster hoist for a wagon box mountable on a wagon frame and operable to angularly move the wagon box between loading and dumping positions. The hoist mechanism comprises an hydraulic cylinder pivotally connected between a pair of link members which are pivoted together at one end and pivoted at their opposite ends to the box and wagon frame, respectively. The pivotal connections between the pair of link members and between the pair of link members and the tiltable frame and the front transverse wagon beam are positioned in substantially the same horizontal plane as the box rear pivotal mounting on the main frame.*

This invention relates to a lift apparatus usable with vehicles equipped with a dump box. More particularly the invention is directed to a bolster hoist for a wagon box mountable on a wagon frame and operable to angularly move the wagon box between loading and dump positions.

It is the object of this invention to provide an improved bolster hoist for a wagon box which provides for a low mounting of the box on the wagon frame.

Another object of the invention is to provide a bolster hoist which is a self-contained assembly adapted to be readily mounted on conventional type farm wagons.

A further object of the invention is to provide a wagon having a box movable from a loading position to a dump position with a bolster hoist which inhibits twisting of the box about its longitudinal axis during its raising and lowering movement.

An additional object of the invention is to provide a wagon bolster hoist having structural components foldable in a nesting relationship to form a compact assembly which is readily moved from a folded position to an expanded position.

A further object of the invention is to provide a wagon bolster hoist which is durable in construction, efficient in operation, and economical to manufacture and install.

These and other objects and advantages of this invention will be readily apparent from the following description and the accompanying drawing, wherein.

Figure 1:
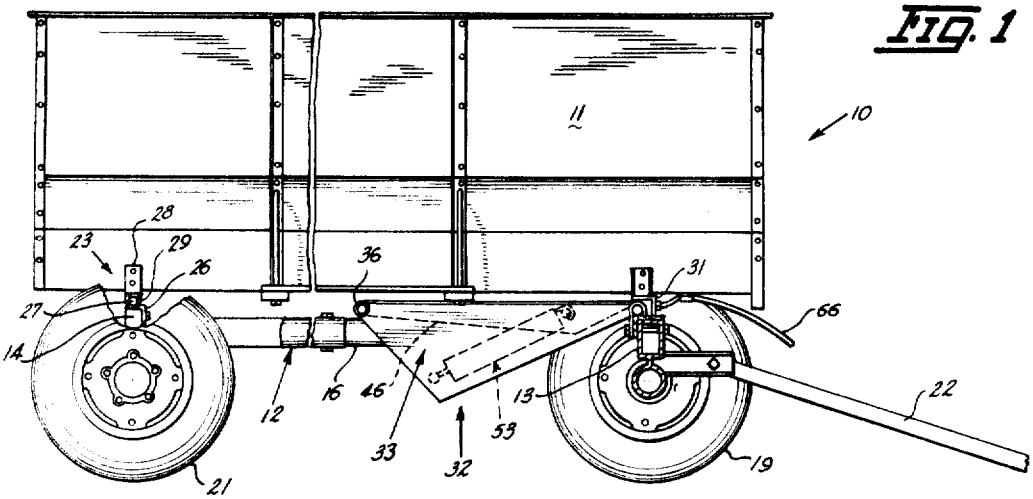
FIG. 1 is a side view of a wagon having a flare-type box equipped with the bolster hoist of this invention.
Figure 2:
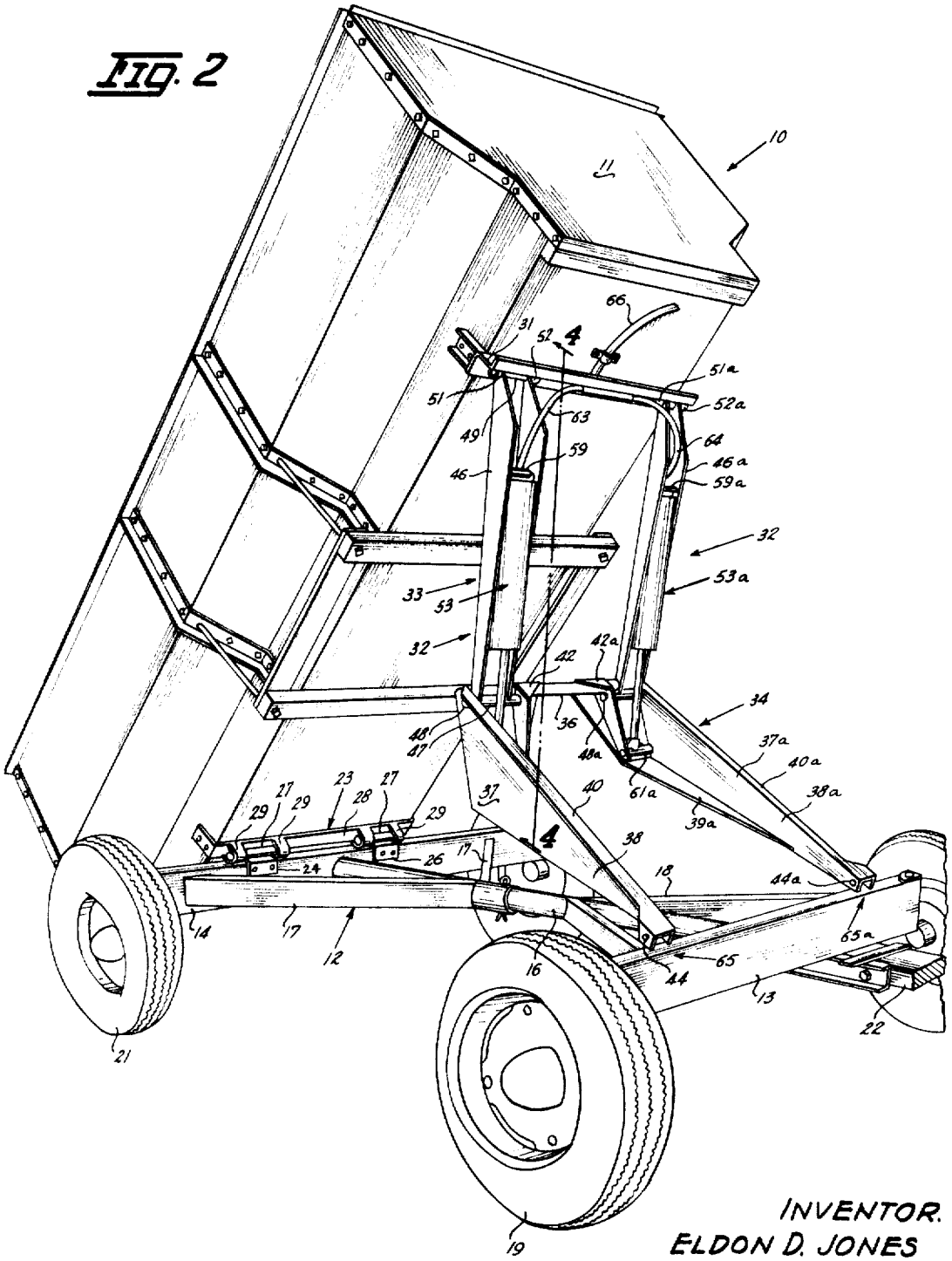
FIG. 2 is an enlarged perspective view of the wagon of FIG. 1 illustrating the hoist in the extended position for holding the box in a dump position.

Referring to the drawing, there is shown in FIG. 1, a vehicle 10 illustrated as a farm wagon having a flared box 11 supported on a frame 12. As best shown in FIG. 2 the frame 12 comprises conventional wagon structure which includes a front transverse beam 13, and a rear transverse beam 14. A longitudinally extended reach 16 connects the beams 13 and 14. Two pairs of diagonal brace members 17 and 18 coact with the reach 16 to hold the beams 13 and 14 in their transverse positions.

Wheel and axle assemblies 19 and 21 are secured to the opposite end sections of the beams 13 and 14, respectively, and support the wagon frame 12 above the ground. The front wheel assemblies 19 are coupled to a forwardly projected tongue 22 which functions as a towing link and is swingable to turn the wheel and axle assemblies 19 relative to the frame 12.

The rear section of the box 11 is pivotally connected to the top of the transverse beam 14 by a hinge unit 23. As shown in FIG. 2, the hinge unit 23 comprises a pair of angle members 24 and 26 secured to the transverse beam 14 on opposite sides of the reach 16. Each angle member has a horizontal pin 27 secured to the top side thereof in a position above and parallel to the beam 14. A plate 28 having upwardly directed end flanges is secured to the bottom of the box 11. Two pairs of U-shaped ear members 29 are secured to the bottom surface of the plate 28 and extend about the opposite ends of the pins 27 to form a pivotal connection between the rear section of the box 11 and the transverse beam 14.

As shown in FIG. 1, the front section of the box 11 has secured to its bottom wall a transverse member 31 having a Z-shape cross section. The upper flange of the Z-shape member 31 is secured to the bottom wall of the box in alignment with the beam 13 of the wagon frame. The lower flange of the member 31 rests on the upper surface of the transverse beam 13. When the box is in the loading position the member 31 supports the front section of the box 11 on the transverse beam 13.

The box 11 is pivoted about the axis of the hinge unit 23 by a hoist mechanism indicated generally by the numeral 32. As shown in FIG. 1, when the box 11 is in the loading position the hoist mechanism 32 is in a folded position and extends rearwardly from the front transverse beam 13 below the box 11. As shown in FIG. 2, when the box is in the dump position the hoist mechanism 32 is in an extended position wherein the front section of the box 11 is elevated. The hoist mechanism 32 comprises a pair of lift assemblies 33 and 34 which are connected at their mid-section by a transverse tubular member 36. The lift assemblies 33 and 34 are right and left-hand pairs and are substantially identical in construction. The following description is limited to the lift assembly 33 with the corresponding structure in lift assembly 34 being indicated with the same reference numerals with the suffix a.

Figure 3:
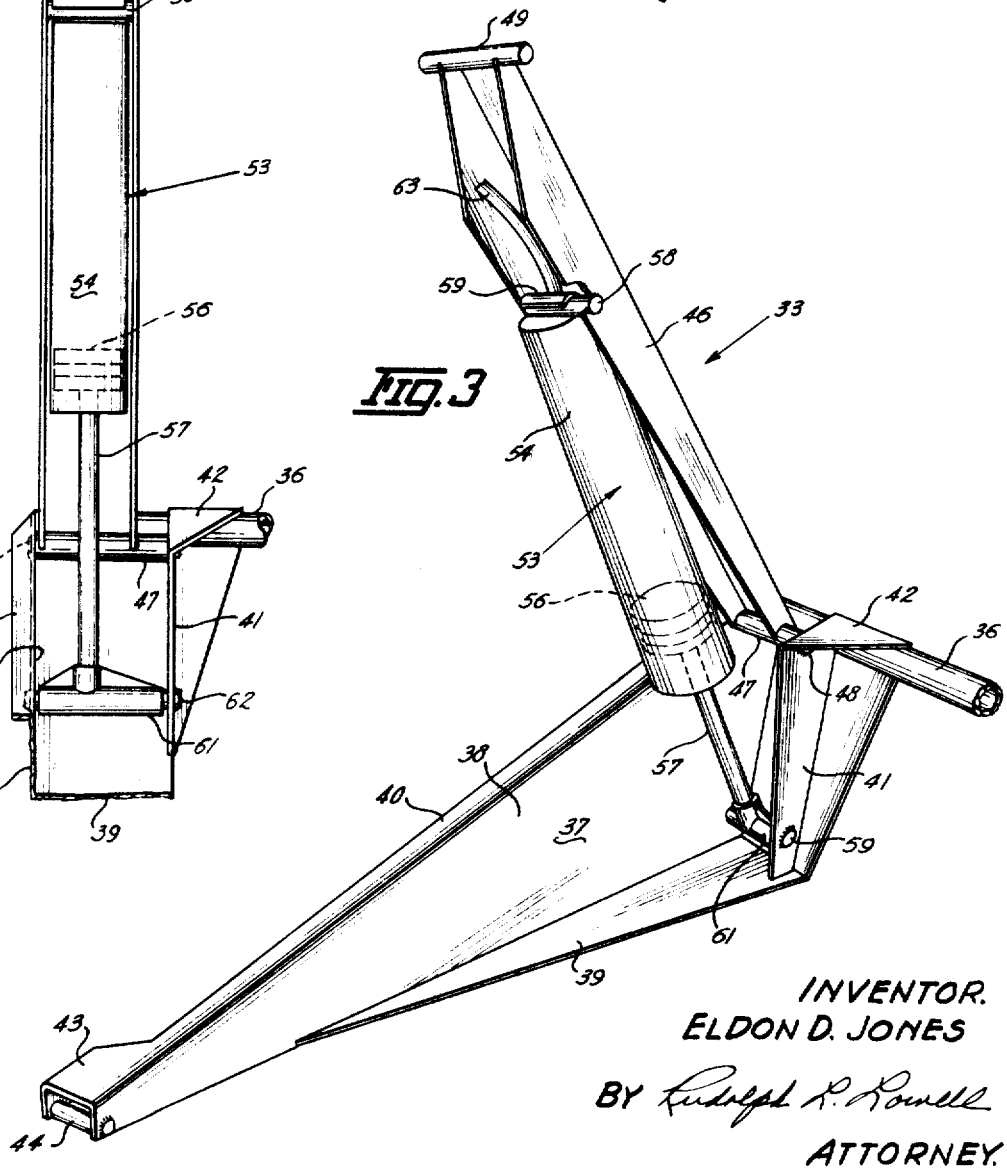
FIG. 3 is an enlarged perspective view of one lift assembly of the hoist of FIG. 1.

As shown in FIG. 3, the lift assembly 33 comprises a first link member 37 having a vertically disposed triangular-shape plate 38 and an outwardly directed flange 40 along the side of the member 37 which defines the longest edge of the triangle. The flange 40 is on the top side of the link member 37 and the triangular portion of the link member projects in a downward direction. The link member 37 is reinforced by a gusset plate 39 which is secured to the lower edges of the link member 37 and the end section of the tubular member 36. An upwardly extended plate 41 is secured to the gusset plate 39 inwardly from and substantially parallel to the link member 37. A triangular-shaped gusset plate 42 is secured to the top of the plate 41 and the adjacent portion of the tubular member 36.

The forward end of the link member 37 has an outwardly and downwardly projected angle leg 43 secured to the flange 40 which defines a downwardly open channel with the vertical side of the link member 37. A transverse pin 44 is secured to the downwardly extended portions of the angle leg 43 and the link member 37.

Figure 4:
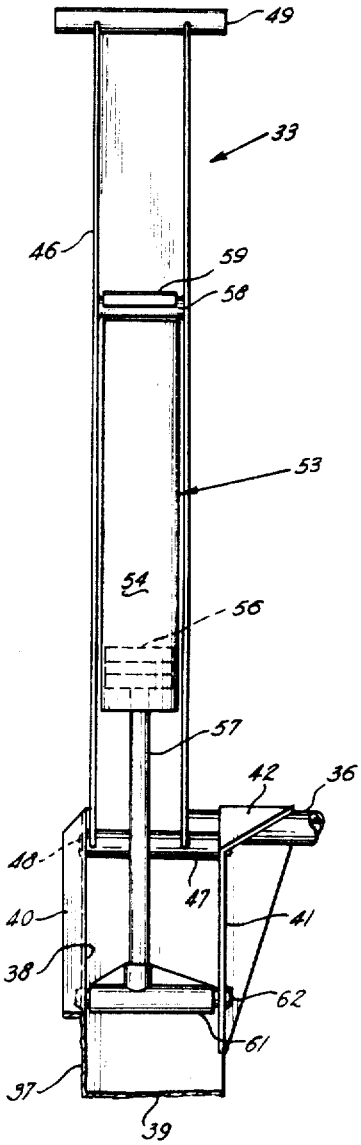
FIG. 4 is an enlarged sectional view taken along the line 4—4 of FIG. 2.

A second link member 46 having a length substantially equal to the length of the first link member 37 is positioned adjacent the inside wall of the link member 37. The link member 46 is a channel member which opens in a downward direction. The rear end sections of the first link member 37 and the second link member 46 are pivotally connected for relative movement on a transverse axis. This pivotal connection is substantially parallel and adjacent to the transverse tubular member 36 and includes a bushing 47 secured to the rear end of the downwardly extended flanges of the second link member 46 and a pin 48 positioned in the bushing 47 and secured at its opposite ends to the upper section of the plate 41 and the rear section of member 37. As shown in FIG. 4 the bushing 47 has a length substantially equal to the transverse distance between the link member 37 and the plate 41 to minimize the transverse movement between the link members 37 and 46.

Figure 5:
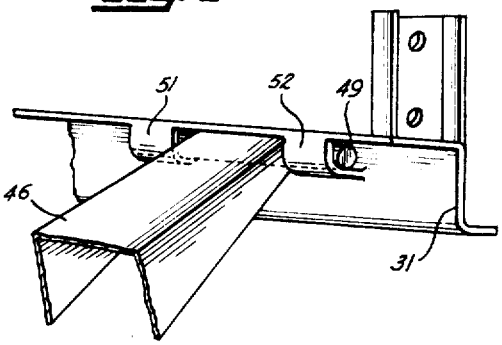
FIG. 5 is an enlarged detail perspective view of the hinge connection between the upper hoist beam and the wagon box.

The downwardly extended flanges of the second link member 46 adjacent the forward end thereof are upwardly inclined to clear the transverse beam 13 of the wagon frame when the box 11 is in the loading position. A transverse pin 49 is welded on the forward end of the channel link member 46. As shown in FIG. 5, the pin 49 is positioned in the pocket of the Z-shaped transverse member 31 and is retained therein by a pair of spaced angle members 51 and 52 positioned about the end sections of the pin 49. The ends of the angle members 51 and 52 are secured to adjacent flanges of the member 31.

A fluid motor 53, illustrated as a single acting hydraulic cylinder and piston assembly, is longitudinally positioned between the first link member 37 and the second link member 46. As shown in FIG. 3, the fluid motor 53 comprises a cylinder 54 into which is slidably disposed a piston 56. A piston rod 57 extends longitudinally from the lower end of the cylinder. The upper or head end of the cylinder 54 is in bearing engagement with a transverse pin 58, the opposite ends of which are secured to the downward flanges of the channel-shaped link member 46 rearwardly of the pin 49. Secured to the head end of the cylinder 54 is a downwardly curved flange 59 which is positioned about the pin 58 to retain the cylinder within the channel of the link member 46.

As best shown in FIG. 4, a crosshead 61 is attached to the outer end of the piston rod 57 and extends transversely between the link member 37 and the plate 41. A transverse pin 62 projects through the crosshead 61 and is secured at its opposite ends to the lower sections of the link member 37 and the plate 41. The connection of the piston rod 57 with the crosshead 61 is offset toward the link member 37 to minimize the twisting effect of the fluid motor 53 and the load on the link member 37.

As shown in FIG. 2, fluid conductor hoses 63 and 64 are coupled to the head end of the fluid motors 53 and 53a, respectively. The hoses 63 and 64 are connected to a common hose 66 which is fastened to the bottom wall of the box and is of a sufficient length to permit coupling with the hydraulic pressure system of a vehicle, such as a tractor.

Figure 6:
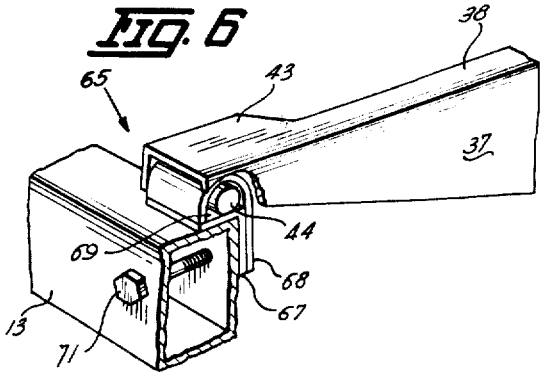
FIG. 6 is an enlarged detail perspective view of the hinge connection between the wagon frame and the lower beam of the hoist.

As illustrated in FIG. 6, the forward end of the first link member 37 is pivotally connected at 65 to the transverse beam 13 of the wagon frame. This pivotal connection 65 is formed by an angle member 67 positioned over the upper rear edge of the transverse beam 13. A hook-shaped member 68 is positioned over the back of the angle member 67 and is secured therewith to define a transverse passage 69. A bolt and nut assembly 71 secures the angle member 67 and member 68 to the beam 13. The transverse pin 44 extends through the passage 69.

As shown in FIG. 1, the hoist mechanism 32 is in a retracted position with the wagon box 11 resting on the transverse beams 13 and 14. The transverse tubular member 36 connecting the lift assemblies 33 and 34 of the hoist mechanism rests on top of the reach 16. In this position the fluid motors 53 and 53a extend in a forward and upward direction with the angle formed by the angle formed by the opposite pivots of the fluid motors 53 and 53a and the pivots between the link members 37 and 46 is substantially 90°. This angular relationship of the fluid motors 53 and 53a results in the maximum lifting force from the fluid motors in the initial movement of the box 11 toward the dump position. In the retracted position the second link members 46 and 46a and the fluid motors 53 and 53a fold adjacent the downwardly directed triangular link members 37 and 37a in a clearance relationship with the pair of diagonal brace members 18 of the wagon frame. The downwardly directed triangular link members 37 and 37a coupled with the nested relationship therewith of the link members 46 and 46a provides for the low mounting of the box 11 on the wagon frame.

In order to raise the wagon box 11 to the dump position as illustrated in FIG. 2, hydraulic fluid under pressure is directed to the common hose 66 and the hoses 63 and 64 to the head ends of the cylinders 54 and 54a, respectively. The fluid pressure in the cylinders conjointly moves the piston rods 57 and 57a out of their respective cylinders. The second link members 46 and 46a pivot about the pins 48 and 48a to effect an upward movement of the front end of the box 11.

The lift assemblies 33 and 34 when moved to an expanded position apply substantially equal forces to opposite side sections of the box 11 and thus provide the wagon box with stability and balance resisting twisting and swaying when it is in a dump position. During the angular movement of the wagon box 11 to the dump position the hinge connections formed by the pins 49 and 49a and the angle members 51, 52 and 51a, 52a on the Z-shaped member 31 carry the lower link members 37 and 37a and the upper link members 46, 46a in an upward direction pivoting the forward ends of the link members 37 and 37a about the pins 44 and 44a.

To return the wagon box 11 to its normal loading position the hydraulic fluid under pressure in the fluid motors 53 and 53a is conjointly released and returned to a fluid reservoir forming part of the vehicle pressure system. With a release of the fluid pressure in the cylinders 54 and 54a the weight of the box 11 moves the piston rods 57 and 58 into the cylinders which in turn results in the folding of the channel link 46 adjacent the triangular link member 37 as shown in FIG. 1. The wagon box 11 pivots about the hinge unit 23 until the lower flange of the Z-shaped member 31 rests on the top of the transverse frame beam 13.

In summary, the hoist mechanism 32 of this invention has a pair of lift assemblies 33 and 34 each of which includes a fluid motor operable to fold and unfold the lift assemblies 33 and 34. When the fluid motors are in an expanded position the lift assemblies are extended holding a wagon box in a dump position. A contraction of the fluid motors moves the lift assemblies into a folded position as illustrated in FIG. 1 returning the wagon box 11 to its normal loading position.

[While there have been shown, described, and pointed out the fundamental novel features of the invention it is to be understood that various omissions, substitutions, changes in form, and details of the apparatus illustrated may be made by those skilled in the art, without departing from the spirit of the invention which is intended to be limited only as indicated by the scope of the following claims.]

I claim:

1. A bolster hoist for moving a pivoted wagon box between a loading position and a dump position, wherein the box has a front section and a rear section which is pivotally mounted on the frame of a wagon, comprising:

(a) a pair of first link members having forward end sections pivotally connected to opposite front portions of the wagon frame, downwardly directed mid-sections, and rear end sections, (b) means connecting the rear end sections of the first link members, (c) a pair of second link members having forward sections, mid-sections and rear sections, with the forward sections pivotally connected to opposite portions of the front section of the box, and the rear end sections pivotally connected to corresponding rear end sections of the first link members, when the wagon box is in the loading position the pivotal connections between the first and second link members and the wagon box and the pivotal connections between the respective first and second link members are positioned in substantially the same horizontal plane as the pivotal mounting coupling the rear section of the box to the wagon frame, and (d) a pair of fluid pressure hydraulic cylinder means, one end of each said cylinder means pivotally connected to the downwardly directed mid-section of one of said first link members below the horizontal plane through said pivot connections and the other end of said hydraulic cylinder means pivotally connected to the mid-section of the corresponding second link member, the other of said cylinder means pivotally connected in a similar manner to the downwardly directed mid-section of the other of said first link members and pivotally connected to the mid-section of the corresponding second link member whereby the downwardly directed mid-sections of the first link members are disposed below the horizontal plane through said pivots when said box is in the loading position on the frame, said pair of fluid cylinder means being conjointly extensible to angularly move the first link members for pivoting the box on the wagon frame to a dump position and being conjointly retractable to permit the box to move from the dump position to the loading position.

2. A lift assembly for a bolster hoist comprising:

(a) a first link member having an upright triangular-shaped plate with the longest section of the plate forming the top side thereof, and upright plate means faced inwardly from and operatively secured to the triangular-shaped plate adjacent the side opposite the hypotenuse, (b) a second link member, (c) means pivotally connecting one end of the second link member to a top portion of the triangular-shaped plate and plate means of the first link member, and (d) a piston and cylinder assembly pivotally connected to the second link member and to a portion of the triangular-shaped plate defined by the side opposite the hypotenuse and the side adjacent thereof and plate means, said piston and cylinder assembly comprising a cylinder pivotally connected at one end to the second link member, a piston slidably disposed in the cylinder, a piston rod secured to the piston and projected from the cylinder, and a crosshead and pin assembly pivotally connecting the piston rod to the triangular-shaped plate and plate means of the first plate member, the crosshead of the crosshead and pin assembly having the piston rod offset toward the upright triangular-shaped plate to minimize the twisting of the piston and cylinder assembly with respect to the first link member.

3. A bolster hoist for moving a pivoted wagon box between a loading position and a dump position while supported by a frame which includes first and second transverse beams interconnected by a longitudinally extending reach with the rear section of the box being pivotally supported on the first of said transverse beams, comprising:

(a) a pair of first link members having forward end sections pivotally connected to the second said transverse beam, downwardly directed mid-sections, and rear end sections, (b) means connecting the rear end sections of the first link members, (c) a pair of second link members having forward sections, mid-sections and rear sections, with the forward sections pivotally connected to opposite portions of the front section of the box, and the rear end sections pivotally connected to corresponding rear end sections of the first link members, when the wagon box is in the loading position the pivotal connections between the first and second link members and the second transverse beam and the wagon box respectively and the pivotal connections between the respective first and second link members are positioned in substantially the same horizontal plane as the pivotal mounting coupling the rear section of the box to the first transverse beam of the frame, and (d) a pair of fluid pressure hydraulic cylinder means disposed on opposite sides of said reach, one end of each said cylinder means pivotally connected to the downwardly directed mid-section of one of said first link members below the horizontal plane through said pivot connections and the other end of said hydraulic cylinder means pivotally connected to the mid-section of the corresponding second link member, the other of said cylinder means pivotally connected in a similar manner to the downwardly directed mid-section of the other of said first link members and pivotally connected to the mid-section of the corresponding second link member whereby the downwardly directed mid-sections of the first link members are disposed below the horizontal plane through said pivots when said box is in the loading position on the transverse beams of the frame, said pair of fluid cylinder means being conjointly extensible to angularly move the first link members relative to the second link members for pivoting the box on the wagon frame to a dump position and being conjointly retractable to permit the box to move from the dump position to the loading position.

4. A bolster hoist for moving a pivoted wagon box between a loading position and a dump position while supported by a frame which includes first and second transverse beams interconnected by a longitudinally extending reach with the rear section of the box being pivotally supported on the first of said transverse beams, comprising:

(a) a pair of hydraulic cylinder means disposed on opposite sides of said reach, (b) and two pairs of link members pivotally interconnecting the front end of the wagon box with the second transverse beam, each such pair of link members being positioned on opposite sides of said reach and each said pair of link members carrying one of said hydraulic cylinder means in pivotal relation to each link member, (c) when the wagon box is in the loading position the pivotal connections between each pair of link members and between each pair of link members and the box and the second beam are positioned in substantially the same horizontal plane as the pivotal mounting coupling the rear section of the box to the first transverse beam of the frame, (d) each said hydraulic cylinder means being so carried by each pair of link members as to be positioned below the horizontal plane through the pivot connections when the box is in the loading position on the transverse beams of the frame, (e) said hydraulic cylinder means being conjointly extensible to angularly move the links of each pair of link members relative to each other for pivoting the box about the first transverse beam to a dump position and being retractable to permit the box to move from the dump position to the loading position.

*5. A hoist for moving a tiltable frame between a horizontal loading position and a dump position while supported by a main frame which includes a forwardly positioned transverse beam with the rear section of the tiltable frame being pivotally supported on the rear section of the main frame, comprising:*

*(a) a hydraulic cylinder means,*

*(b) a pair of link members having rear end sections pivotally connected together, said pair of link members pivotally interconnecting the front section of the tiltable frame with the transverse beam and carrying said hydraulic cylinder means in pivotal relation to each link member,*

*(c) when the tiltable frame is in the loading position the pivotal connections between said pair of link members and between said pair of link members and the tiltable frame and the transverse beam are positioned in substantially the same horizontal plane as the pivotal mounting coupling the rear section of the tiltable frame to the rear section of the main frame,*

*(d) said hydraulic cylinder means being so carried by said pair of link members as to be positioned below the horizontal plane through the pivotal connections when the tiltable frame is in the loading position on said main frame,*

*(e) said hydraulic cylinder means being extensible to angularly move said pair of links relative to each other for pivoting the tiltable frame relative to the main frame to a dump position and being retractable to permit the tiltable frame to move from the dump position to the loading position.*

References Cited

The following references, cited by the Examiner, are of record in the patented file of this patent or the original patent.

UNITED STATES PATENTS

| | | | |
|---|---|---|---|
| 2,332,961 | 10/1943 | Wood | 298—22 |
| 3,210,120 | 10/1965 | Gouin | 298—22 |
| 2,437,656 | 3/1948 | Steenhoven | 298—22 |
| 2,868,583 | 1/1959 | Harbers | 298—22 X |
| 3,043,629 | 7/1962 | Schlueter et al. | 298—22 |
| 3,084,908 | 4/1963 | Klein | 298—22 |

FOREIGN PATENTS

| | | |
|---|---|---|
| 78,572 | 4/1963 | Norway. |

RICHARD J. JOHNSON, *Primary Examiner.*